INVENTORS
H.F. BLAIR
T. W. ROBBINS
BY S. Gundersen
ATTORNEY

March 23, 1965 H. F. BLAIR ETAL 3,174,744
APPARATUS FOR SUPPORTING TERMINALS
Filed Jan. 3, 1963 5 Sheets-Sheet 2

INVENTORS
H.F. BLAIR
T.W. ROBBINS
BY S. Gundersen
ATTORNEY

March 23, 1965   H. F. BLAIR ETAL   3,174,744
APPARATUS FOR SUPPORTING TERMINALS
Filed Jan. 3, 1963   5 Sheets-Sheet 3
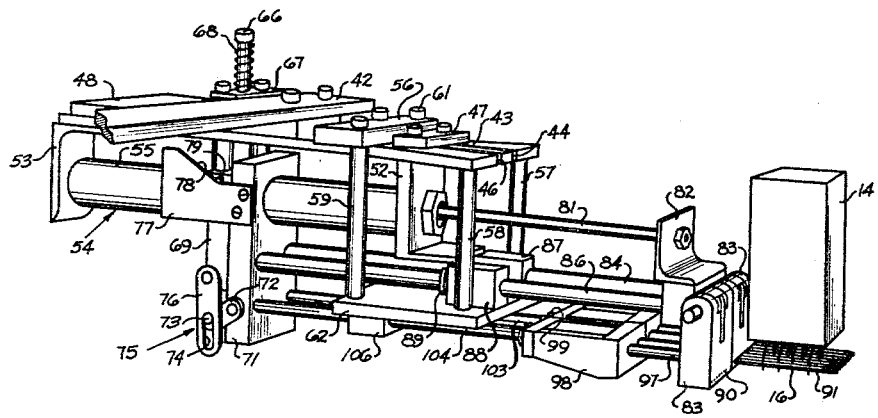
Fig. 5
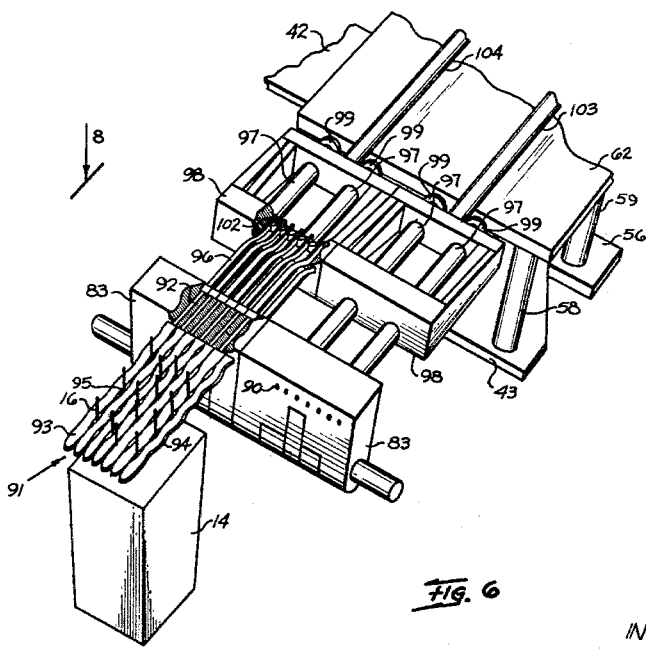
Fig. 6
INVENTORS
H.F. BLAIR
T.W. ROBBINS
BY S. Gundersen
ATTORNEY March 23, 1965    H. F. BLAIR ETAL    3,174,744
APPARATUS FOR SUPPORTING TERMINALS
Filed Jan. 3, 1963      5 Sheets-Sheet 4
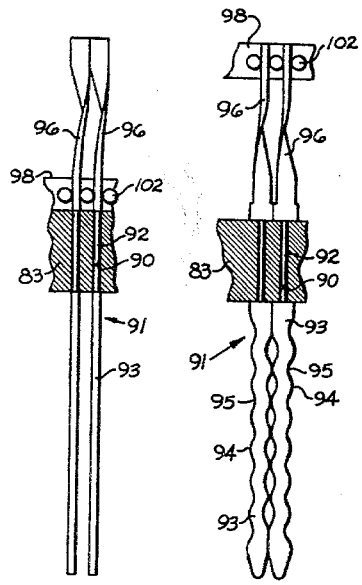
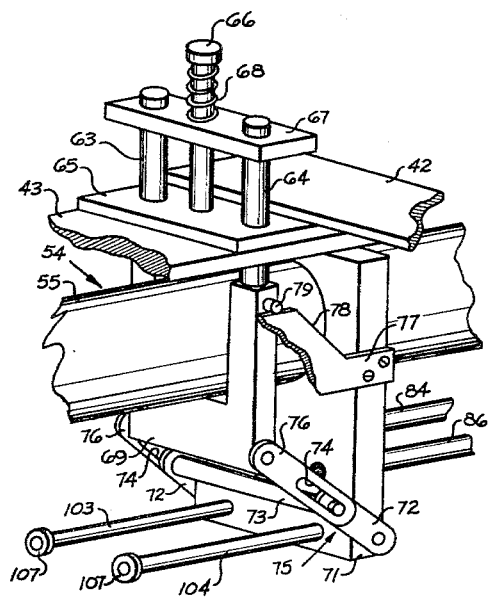
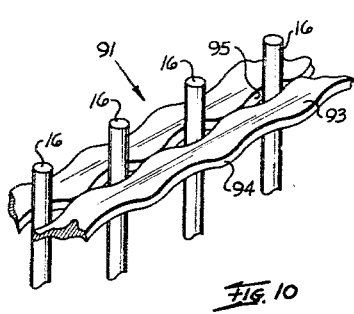
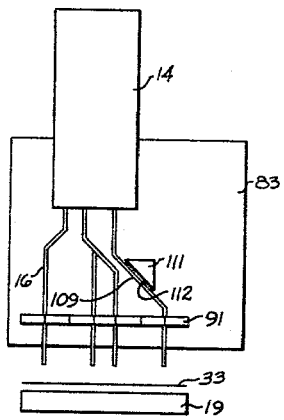
INVENTORS
H.F. BLAIR
T.W. ROBBINS
BY S. Gundersen
ATTORNEY 3,174,744
APPARATUS FOR SUPPORTING TERMINALS
Harold F. Blair, Worthington, and Theodore W. Robbins, Columbus, Ohio, assignors to Western Electric Company, Incorporated, New York, N.Y., a corporation of New York
Filed Jan. 3, 1963, Ser. No. 249,177
11 Claims. (Cl. 269—24)

This invention relates to apparatus for supporting terminals, and particularly relates to apparatus for temporarily supporting fragile terminals in a desired alignment during a period wherein the terminals are subjected to unusual stresses.

Frequently, in the manufacture and assembly of electronic equipment, it is necessary to subject fragile component terminals to unusual stresses which result in the bending or breaking of the fragile terminals. An example of such a condition, where the terminals are subjected to unusual stresses, is revealed in the method of assemblying fragile component terminals with flexible printed circuits by punching the terminals through land areas of the printed circuit as disclosed in a copending application in the names of H. F. Blair and D. F. Thomas, Serial No. 249,181, which was filed on January 3, 1963.

It is, therefore, an object of this invention to provide a new and improved apparatus for supporting terminals.

Another object of this invention is to provide apparatus for temporarily supporting fragile terminals in a desired position during a period wherein the terminals are subjected to unusual stresses.

A further object of the invention is the provision of apparatus for positioning a plurality of terminal-supporting elements about a plurality of terminals extending from a component so that the terminals are aligned and supported thereby.

With these and other objects in view, the present invention contemplates a plurality of fingers extending from a movable support and formed with a series of terminal closures along opposite edges thereof. Means are provided for positioning the fingers between rows of the terminals. Subsequently, the fingers are moved so that the terminals are engaged by and supported between opposed, complementary closures of adjacent fingers. Thereafter, the fragile terminals may be subjected to unusual stresses.

Other objects, advantages and novel aspects of the invention become apparent upon consideration of the following detailed description in conjunction with the accompanying drawings in which:

FIG. 5 is a perspective view showing the position of the support and the fingers in a terminal-supporting position;

FIG. 6 is a partial view showing the underside of the support and the fingers in the terminal-supporting position as shown in FIG. 5;

FIG. 7 is a perspective view of a locking mechanism for controlling the movement of the support and the fingers with parts broken away for clarity;

FIG. 8 is a sectional view taken along line 7—7 of FIG. 4 showing a detailed structure of a pair of fingers held in the support in a normal rest position;

FIG. 9 is a sectional view taken along line 8—8 of FIG. 6 showing a pair of the fingers held in the support in a terminal-supporting position;

FIG. 10 is a partial view showing component terminals held between the fingers in a terminal-supporting position;

FIG. 11 is a view showing an angled wedge for supporting an offset bend of a row of terminals extending from a component.

Figure 1:
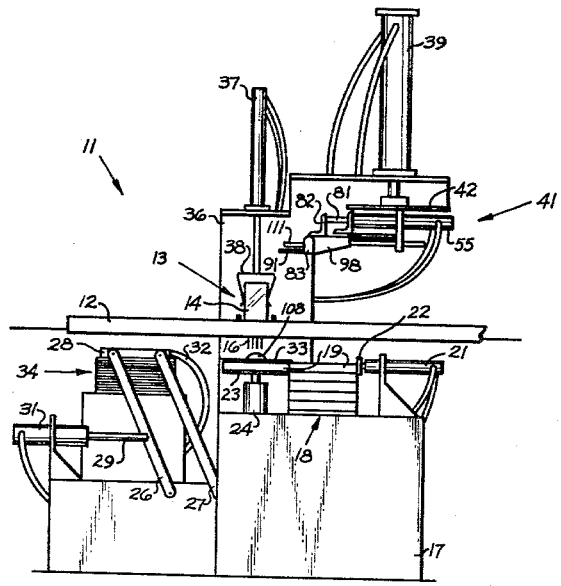
FIG. 1 is a front view of the apparatus of the invention, cooperating with apparatus utilized in the method of punching component terminals through flexible printed circuits.

Referring to FIG. 1, an assembly apparatus, designated generally by the reference numeral 11, is utilized to facilitate the assembly of the component terminals with flexible printed circuits in accordance with the method of punching the terminals through the printed circuits as disclosed in the copending application of H. F. Blair and D. F. Thomas. The assembly apparatus 11 is provided with a pair of parallel racks 12 (one shown) having latching features for holding and transporting units such as telephone crossbar units 13. Each of the units 13 support a plurality of components 14 having a plurality of fragile terminals 16 which extend downwardly therefrom and project beneath the racks 12. The racks 12 are moved to position the units 13 above a housing 17 which supports a supply 18 of pads 19 having a gum-like consistency. An air cylinder 21, supported on the housing 17, is attached to a pusher 22 which periodically engages the uppermost pad 19 of the pad supply 18 to urge the pad onto a platform 23 which is supported by an air cylinder 24. A pair of arms 26 and 27 are pivotally mounted to the housing 17 at one end thereof and are attached to a vacuum lift head 28 at the opposite end thereof. The intermediate portion of the arm 26 is connected to a piston rod 29 of an air cylinder 31 to control the pivotal movement of the arms 26 and 27 and the vacuum lift head 28. In addition, the vacuum lift head 28 is connected through a conduit 32 to a vacuum supply source (not shown). Upon actuation of the vacuum supply source, the vacuum lift head 28 vacuumly grips a flexible printed circuit 33 from a printed circuit supply source 34. Thereafter, the air cylinder 31 is actuated to move the vacuum lift head 28 and the gripped printed circuit 33, whereby the flexible printed circuit is positioned atop the previously positioned pad 19. A vertical stand 36 is supported by, and extends upwardly from, the housing 17 and supports an air cylinder 37 which controls an overhead clamp 38 for engaging and clamping the unit 13 against the racks 12, thereby preventing any upward movement of the unit. In addition, the stand 36 supports an air cylinder 39 which controls a pneumatically operated terminal-supporting apparatus embodying the principles of the invention and is generally designated by the reference numeral 41. A brace 42, extending from air cylinder 39, supports the apparatus 41.

Figure 2:
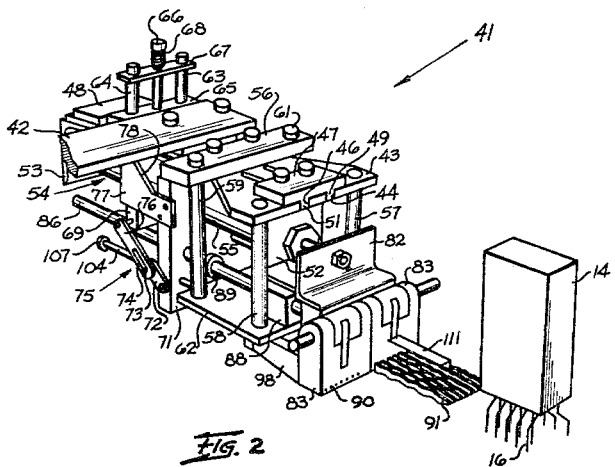
FIG. 2 is a perspective view showing a plurality of terminal-supporting fingers and a support for the fingers positioned adjacent to a component having fragile terminals extending therefrom.
Figure 3:
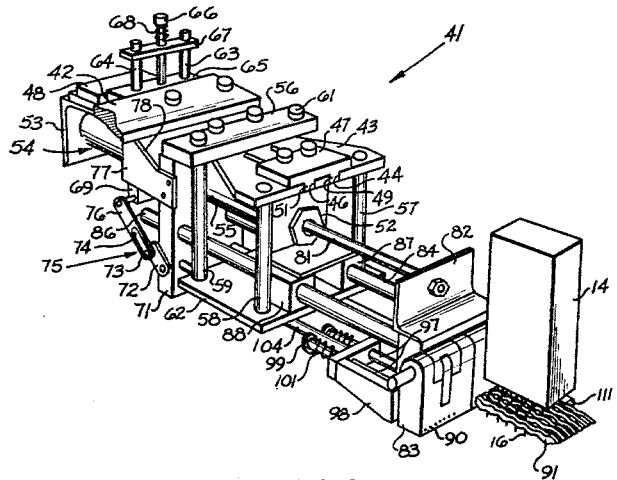
FIG. 3 is a perspective view showing the fingers positioned between the fragile terminals of the component.

As shown in FIGS. 2, 3 and 5, the terminal-supporting apparatus 41 is fastened to the brace 42 for controlled vertical movement by the air cylinder 39. A common base plate 43 is attached intermediate the ends thereof to the brace 42 and is provided with a pair of parallel, spaced slots 44 and 46 at each end thereof. A pair of slides 47 and 48 are each provided with a pair of spaced, parallel projections 49 and 51 which are slideably positioned within the slots 44 and 46, respectively, of each end of the base plate 43. An L-shaped bracket 52 is fastened to the slide 47 and an inverted L-shaped bracket 53 is fastened to the slide 48, wherein the L-shaped brackets 52 and 53 provide a support for a shell 55 of a fluid cylinder such as air cylinder 54 therebetween. A cross block 56 cooperates with the base plate 43 for supporting four vertical rods 57, 58, 59 and 61, which support a base platform 62 at the opposite ends thereof. As further shown in FIG. 7, a pair of rods 63 and 64 are vertically positioned for slideable movement through a support plate 65 and the base plate 43, and are sufficiently spaced to allow the passage of the shell 55 of the air cylinder 54 therebetween. A headed pin 66 is slideably positioned through a crossbar 67 and fastened to the support plate 65 where the crossbar is fixedly attached to the upper free ends of the rods 63 and 64. Further, a compression spring 68 is positioned about the pin 66 between the head of the pin and the crossbar 67 for normally urging the rods 63 and 64 downwardly. A locking bar 69 (FIG. 7) is connected between the lowermost ends of the rods 63 and 64.

As viewed in FIGS. 2, 3, 5 and 7, a bearing plate 71 is fastened around an intermediate portion of the shell 55 of the air cylinder 54 and pivotally supports a pair of arms 72 on opposite sides thereof. A rod 73 is supported at the free ends of the arms 72 and extends therefrom into slots 74 of a pair of arms 76 which are pivotally mounted to opposite sides of the locking bar 69, thereby forming a linkage 75. In addition, the bearing plate 71 supports a cam 77 having camming surface 78 which cooperates with a cam pin 79 mounted on the locking bar 69. A piston rod 81 extends from the air cylinder 54 and supports an L-shaped bracket 82 at the free end thereof. The L-shaped bracket 82 provides a support for a pair of finger support blocks 83 which depend therefrom. In addition, a pair of rods 84 and 86 are fastened to the support blocks 83 and are slideably positioned within a pair of stop blocks 87 and 88, respectively, which are mounted on the base platform 62. The rods 84 and 86 are also slideably positioned within apertures formed in the bearing plate 71 for sliding movement therethrough. Each of the rods 84 and 86 are formed intermediate the ends thereof with an annular rib 89 which is positioned between the stop blocks 87 and 88 and the bearing plate 71.

As shown in FIGS. 4, 6, 8 and 9, each of a plurality of terminal-supporting fingers or blades 91, which subsequently surround and accurately align the terminals in a supporting fashion, is formed with an intermediate shank 92. A flat 93 extends in one direction from the shank 92 and is provided with scalloped or notched edges 94 on opposite sides thereof having depressions or notches 95 which conform substantially to a half-section configuration of the terminal 16 and are complementary with notches 95 of adjacent fingers 91 to subsequently surround a portion of the terminals 16 a predetermined distance from the free ends thereof. It is to be noted that the depressions or notches 95 of one side of the flat 93 are not aligned with the depressions or notches 95 of the opposite side to accommodate a particular terminal arrangement extending from the component 14. In addition, each of the fingers 91 is formed with a flat 96 which extends in the opposite direction from the shank 92 and is provided with a 90° twist at the free end thereof. Each of the shanks 92 of the fingers 91 are rotatably positioned within apertures 90 formed in the support blocks 83 so that the flat 93 extends from the support blocks toward the component 14 and the twisted flats 96 extend from the support blocks in the opposite direction. It is to be noted that the fingers 91, as shown in FIGS. 2 through 6, are mounted in one support block 83 and the adjacent support block 83 reveals the apertures 90 for rotatably receiving the shank 92 therein. As viewed in FIGS. 3 through 6, a plurality of rods 97 extend from the support blocks 83 in a direction parallel with the twisted flats 96 of the fingers 91 and support a pair of slides or sliding cams 98 thereon. Each of the rods 97 is provided with an enlarged head 99 (FIG. 4) at the free end thereof and retains a compression spring 101 concentrically mounted about each of the rods 97 and held between the sliding cams 98 and the head 99 for normally urging the sliding cams 98 toward the support blocks 83. As shown in FIGS. 8 and 9, the sliding cams 98 are provided with a plurality of vertically positioned, spaced pins 102 which slideably receive in the spaces therebetween the twisted free ends of the flats 96 of the fingers 91. A pair of rods 103 and 104 are fastened to the sliding cams 98 and are slideably mounted within a guide block 106 which depends from the base platform 62 and extend slideably through apertures in the bearing plate 71 and are provided with enlarged heads 107 (FIG. 7) on the free ends thereof to prevent the complete passage of the rods through the bearing plate.

Occasionally, in the manufacture of electrical units having components such as components 14 shown in FIG. 11, a pile up of terminals 16 extend from the component in a relatively small area, thereby necessitating substantial offset bends 109 along intermediate portions of some of the terminals to disperse the free ends of the terminals from the pile up to a more accessible arrangement. Further, the offset bends 109 occasionally extend along a considerable length of the terminal 16 and tend to buckle in the area of the offset bend when the terminals are subjected to columnar forces. It is, therefore, necessary to provide a bracing wedge 111 with an angled face 112 corresponding to the angle of the offset bend 109 to support the terminal in the area of the bend. Such a wedge 111 is fixedly mounted to each support block 83 and extends toward the component 14, as shown in FIG. 2, in a direction parallel with the flats 92 of the fingers 91. Therefore, the terminals 16 are supported and aligned by the fingers 91 to prevent the terminals from bending or breaking in a lateral direction, and the bracing wedge 111 supports the terminals at the offset bends 109 to prevent these terminals from buckling under the columnar pressure applied to the terminals during the assembly operation.

*Operation*

Figure 4:
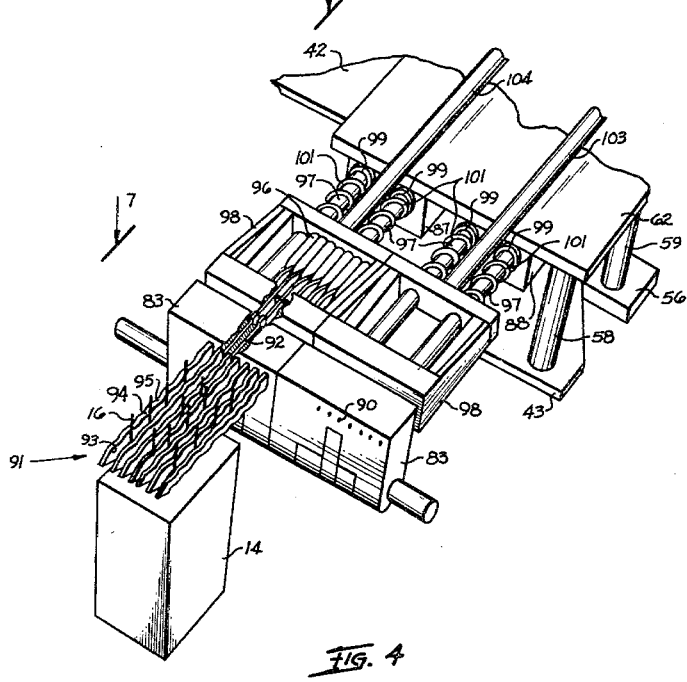
FIG. 4 is a partial view of the underside of the fingers positioned between the component terminals as shown in FIG. 3.
Figure 12:
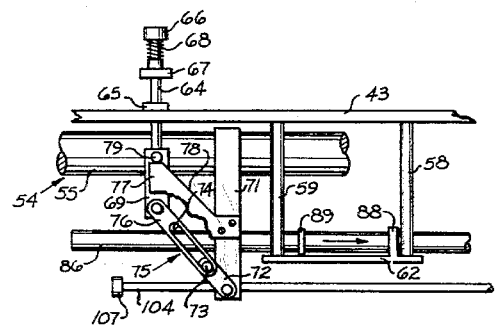
FIGS. 12 through 15 are partial views showing the sequential positions of the locking mechanism actuated during the movement of the support for locking the fingers in the terminal-supporting position.
Figure 13:
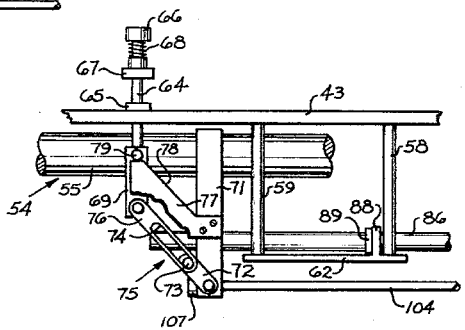

As shown in FIG. 2, the terminal-supporting apparatus 41 is in a normal rest position wherein the slides 47 and 48 are shown in an extended position. In addition, the cam 77 is spacially positioned from the locking bar 69 so that the linkage 75 is in an extended position. The fingers 91 are aligned in a nonsupporting position wherein the flat surfaces of each flat 93 are face-to-face but sufficiently spaced for the subsequent reception of the terminals therebetween. Upon actuation of air cylinder 39 (FIG. 1), the terminal-supporting apparatus 41 is positioned so that the fingers 91, in the nonsupporting alignment, are adjacent to the area of the terminals 16 extending from the component 14 as shown in FIG. 2. Thereafter, the air cylinder 54 is actuated on a forward cycle to move the piston rod 81 from within the air cylinder so that the support blocks 83 are moved toward the component 14. As the support blocks 83 are moved toward the component 14, the flats 93 of the fingers 91, in a face-to-face, nonsupporting alignment, are inserted between the terminals 16 as viewed in FIGS. 3 and 4. Further, the angled face 112 of the wedge 111 is positioned adjacent to the offset bends 109 of the row of terminals 16 having extended offset bends as shown in FIG. 11 so that these terminals are supported against subsequently applied columnar forces which tend to buckle the terminals in the area of the extended offset bend. Also, the rods 84 and 86 are slideably moved through the apertures of the bearing plate 71 and the stop blocks 87 and 88, respectively. The compression springs 101 maintain the sliding cams 98 in a position adjacent to the support blocks 83 as shown in FIGS. 3 and 4. As the sliding cam 98 moves with the support blocks 83, the rods 103 and 104 slide through the apertures of the bearing plate 71 and the guide block 106 (FIG. 5). As shown in FIG. 12, the relative movement of the rods 84, 86, 103 and 104 is in the direction of the arrows toward the component 14. In addition, the cam pin 79 is resting on the uppermost portion of the cam surface 78, thereby retaining the rods 63 and 64 in a raised position. Subsequently, the annular ribs 89 of the rods 84 and 86 engage the stop blocks 87 and 88, respectively, to preclude further movement of the support blocks 83 as shown in FIG. 13. In addition, the enlarged heads 107 (FIG. 7) of the rods 103 and 104 engage the bearing plate 71 to preclude further movement of the rods therethrough.

Figure 14:
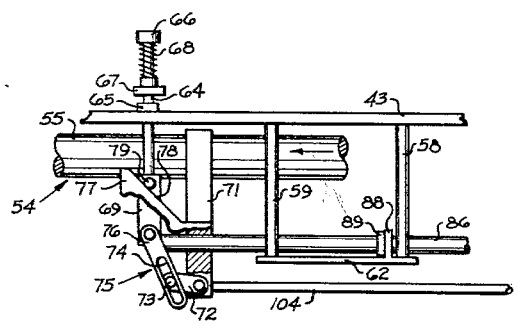
Figure 15:
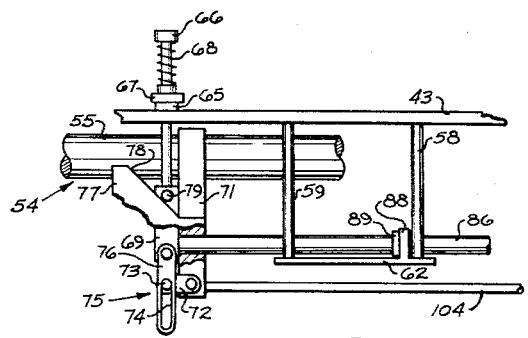

Pneumatic pressure is continuously applied to the air cylinder 54 and since the forward movement of the supporting structure is precluded as described, the shell 55 of the air cylinder 54 will move in a reverse direction over the piston rod 81 so that an additional portion of the piston rod is exposed but not moved. As the shell 55 is moved rearwardly, as shown in FIG. 14, the bearing plate 71, which is fastened thereto, is also moved rearwardly, whereby the rods 103 and 104 are pulled with the bearing plate 71 in a rearward direction. As the rods 103 and 104 move rearwardly, the sliding cams 98, which are fastened thereto, are pulled away from the support blocks 83 against the biasing action of the compression springs 101. As shown in FIGS. 8 and 9, the relative movement of the sliding cam 98 urges the vertical pins 102 along the twisted flats 96 of the fingers 91 to rotate the fingers through a 90° angle, whereby the flats 93 of the fingers assume a position so that the flat surfaces thereof are coincident with common planes, respectively, as shown in FIGS. 9 and 10. In this manner, a portion of each of the terminals 16, extending from the component 14, are surrounded a predetermined distance from the free ends thereof between the opposed, complementary notches 95 of the scalloped edges 94 of adjacent fingers 91 as shown in FIG. 10 and are cammed into a desired alignment and laterally supported thereby against subsequent columnar forces which tend to bend or break the terminals. In addition, as the air cylinder 54 moves rearwardly, the bearing plate 71 is slideably guided over the rods 84 and 86 and approaches the locking bar 69, whereby the cam pin 79 slides downwardly along the cam surface 78 so that the locking bar 69 is lowered due to the biasing action of the spring 68. In this manner, the extended ends of the rod 73 are urged relatively in an upward direction through the slots 74 of the arms 76 as shown in FIG. 14. Thereafter, the bearing plate 71 is positioned adjacent to the locking bar 69 as shown in FIG. 15, whereby the locking bar 69 is positioned adjacent to the free ends of the rods 84 and 86 to lock the rods in the terminal-supporting position. In addition, the rod 73 engages the heads 107 of the rods 103 and 104 to lock the sliding cam 98 in the terminal-supporting position. In this manner, the fingers 91, the support blocks 83 and the sliding cams 98 are precluded from movement during the period when the terminals are held within the opposed, complementary notches 95 of adjacent fingers 91.

Thus, it is seen that by the sequential control of the air cylinder 54 and the relative movement between the shell 55 and the piston rod 81 and associated elements connected thereto, the terminals 16 are initially cammed into a desired alignment by the surrounding of the fingers 91 about the terminals a predetermined distance from the free ends thereof prior to the assembly of the terminals with the printed circuit panel 33. Thereafter, the fingers 91 support the terminals 16 during the relative punching of the terminals into the printed circuits 33, thereby preventing lateral deflection of the terminals, and possible breaking thereof, as a result of the unusual columnar forces to which the terminals are subjected during the punching. In addition, the wedge 111 supports the extended offset bends 109 of a row of the terminals 16, thereby preventing the buckling of the terminals due to the unusual columnar forces which could urge the terminals through the complementary notches 95 of the adjacent fingers 91, thereby buckling the terminals in the area of the offset bends. It is to be understood that the supporting of terminal-like elements, such as the terminals 16, in this manner, not only overcomes the undue stresses subjected to the terminals by the punch operation, but may be utilized to overcome stresses resulting from other operations which are apparent to those skilled in the art.

Thereafter, as shown in FIG. 1, the air cylinder 24 is actuated to vertically raise the platform 23 and the pad 19 and the flexible printed circuit 33 positioned thereon, whereby the terminals 16 of the unit 14 are relatively punched through land areas of the printed circuit and move to the pad 19. During this operation, the fingers 91 surround portions of the terminals 16 as shown in FIG. 10, thereby supporting the terminals during the punching operation to prevent bending or breaking of the terminals due to the unusual stress resulting from the operation. Thereafter, the air cylinder 24 is deactuated to remove the platform and the pad 19 from the area of the terminal 16. An air cylinder 108 is actuated to discharge the pad 19 from atop the platform 23, thereby providing space for the next pad 19 to be inserted on the platform from the pad supply 18. Subsequently, the pneumatic pressure within the air cylinder 54 is reversed to initiate a reverse cycle of the removal of the fingers 91 and the wedge 111 from the area of the terminals 16.

As the finger removal operation is initiated, the pressure within the air cylinder 54 attempts to withdraw the piston rod 81 within the cylinder shell 55. However, the rods 84 and 86, which are attached to the support blocks 83, are precluded from rearward movement by the blocking action of the locking bar 69, thereby precluding movement of the piston rod 81 into the cylinder shell 55. Therefore, the shell 55 of the air cylinder 54 moves forward over the piston rod 81 and simultaneously moves the bearing plate 71 toward the component 14. As the bearing plate 71 moves forward, the pivotal arms 72 maintain a substantially stationary position due to the movement of the extended rod 73 through the slots 74 of the arms 76. As previously discussed, the heads 107 of the rods 103 and 104 are held between the bearing plate 71 and the rod 73 and are thereby carried with the bearing plate upon the forward movement. The sliding cams 98, which are fastened to the opposite ends of the rods 103 and 104, are thereby urged toward the support blocks 83, whereby the fingers 91 are rotated by the cooperation of the pins 102 with the twisted flats 96 so that the fingers assume a position wherein the flat surfaces of the flats 93 are face-to-face in a nonsupporting alignment as shown in FIGS. 3, 4 and 8. Simultaneously, the cam pin 79 is urged upwardly by movement of the cam 77, thereby raising the rods 63 and 64 and the locking bar 69. However, even though the locking bar 69 is being raised, it maintains a position adjacent to the free ends of the rods 84 and 86, thereby continuing the preclusion of movement of the housings 83 during the period when the fingers 91 are rotated from a supporting to a nonsupporting position.

Subsequently, the rods 63 and 64 are raised to an uppermost position as shown in FIGS. 3 and 7, whereby the extended ends of the rod 73 are precluded from further sliding movement within the slot 74 so that the linkage 75 assumes a substantially extended position. In this manner, the rod 73 is moved upwardly and out of the path of movement of the rods 103 and 104, and the locking bar 69 is removed from the path of the rods 84 and 86 which are shown partially removed in FIG. 7 for reasons of clarity. Thereafter, the continued application of pressure within the air cylinder 54 is directed toward drawing the piston rod 81 into the cylinder rather than moving the cylinder shell 55 over the previously stationary piston rod. Hence, it is seen that on the reverse cycle, the shell 55 of the air cylinder 54 continues to move over the piston rod 81 until the locking bar 69 has been removed from the path of movement of the rods 84 and 86. The support blocks 83 are free to move away from the component 14 in view of the removal of the locking bar 69 and thereafter the pressure within the air cylinder 54 urges the piston rod 81 within the cylinder shell 55 to a position as shown in FIG. 2 rather than the continued movement of the cylinder shell over the piston rod. Subsequently, the air cylinder 39 is deactuated to withdraw the terminal-supporting apparatus 41 to a position as shown in FIG. 1. Deactuation of the air cylinder 37 removes the clamp 38 from engagement with the unit 13, and the movement of the racks 12 transfers the assembled component and circuit to a subsequent station. Thus it is seen that the apparatus 41, including the fingers 91, can be withdrawn without disturbing the assembled terminals 16 and printed circuit 33.

It is to be noted that the terminal-supporting apparatus can be modified to accommodate the simultaneous supporting of the terminals 16 extending from a plurality of components 14. Such modifications would incorporate the combining of additional terminal-supporting apparatus 41 supported by the brace 42.

It is to be understood that the above-described apparatus is simply illustrative of the principles of the invention. The configuration of the fingers 91, the wedge 111 and the supporting structure could be altered by those skilled in the art to accommodate terminals or terminal-like elements of different shapes and arrangements without deviating from the principles of the invention and such alterations would fall within the spirit and scope of the invention.

What is claimed is:

1. An apparatus for supporting terminals extending from a component, which comprises:
   a support block,
   a plurality of fingers supported by and extending from the block, each of the fingers formed with terminal-enclosing portions which cooperate with complementary enclosing portions of adjacent fingers to surround a portion of the terminals,
   means for positioning the fingers between rows of the terminals,
   means for moving the fingers to a terminal-surrounding position, and
   means for sequentially controlling the positioning and moving means, whereby the fingers are positioned between the rows of terminals and then moved so that portions of the terminals are surrounded by complementary enclosing portions of the fingers in a supporting fashion.

2. An apparatus for supporting terminals of components, which comprises:
   means for enclosing and supporting the terminals,
   means for positioning the enclosing means between the terminals in a nonsupporting orientation,
   means for moving the enclosing means into supporting engagement with the terminals, and
   means for sequentially controlling the positioning and moving means, whereby the enclosing means is positioned between the terminals and then moved to surround portions of the terminals in a supporting fashion.

3. An apparatus for aligning and supporting terminals of a component, which comprises:
   a plurality of fingers having cam-engaging portions at one end and a series of notches formed on opposite edges thereof at the opposite end,
   a support block, the fingers rotatably supported within the block so that the notched edges extend therefrom,
   camming means engaging the cam-engaging portions of the fingers for rotating the fingers,
   means for positioning the block adjacent to the component so that the fingers are inserted in a nonsupporting orientation between aligned rows of the terminals,
   means for actuating the camming means to rotate the fingers to position complementary notches of adjacent fingers about the terminals in an aligning and supporting fashion, and
   means for sequentially controlling the block-positioning means and the means for actuating the camming means.

4. An apparatus for aligning and supporting terminals of components, which comprises:
   a support block,
   a plurality of fingers rotatably supported in and having portions extending in opposite directions from the block, each of the finger portions extending in one direction formed with notches on opposite edges thereof complementary with notches of adjacent fingers, each of the finger portions extending in the opposite direction formed with a twisted free end,
   a slide slideably attached to the block and having a plurality of parallel, spaced pins for receiving the twisted ends of the fingers therebetween,
   means for positioning the fingers between aligned rows of the terminals in a nonsupportnig fashion, and
   means for relatively moving the side and the block whereby the twisted portions of the fingers are guided between the pins to rotate the fingers within the block and position complementary notches of adjacent fingers about the terminals in an aligning and supporting fashion.

5. An apparatus for supporting terminals of a component, which comprises:
   a plurality of fingers having terminal-engaging notches formed on opposite edges complementary with notches of adjacent fingers,
   a support block for rotatably supporting an intermediate portion of the fingers,
   a plurality of rods extending from the support block,
   a cam slidably attached to the rods and engaging a portion of the fingers,
   a fluid cylinder having a shell with a piston rod extending therefrom wherein the rod is attached to the block, the cam connected to the fluid cylinder shell,
   means for normally urging the cam into a position adjacent to the block,
   means for actuating the fluid cylinder, whereby the piston rod is moved to position the block adjacent to the component and the fingers between aligned rows of terminals in a nonsupporting position,
   means for precluding the movement of the piston rod upon the positioning of the fingers between the rows of terminals, and
   means for moving the fluid cylinder shell relative to the piston rod, whereby the cam is slideably moved from the block to rotate the fingers so that the complementary notches of adjacent fingers are positioned about the terminals in a supporting fashion.

6. An apparatus for aligning and supporting terminals of a component, which comprises:
   a support block,
   a plurality of fingers rotatably mounted within the block having portions extending in opposite directions from the block, each of the portions of the fingers extending in one direction from the block having terminal-enclosing notches formed on opposite edges thereof complementary with notches of adjacent fingers,
   a cam slideably attached to the block,
   means for urging the cam to a position adjacent to the block, each of the portions of the fingers extending in the opposite direction from the block positioned in engagement with the cam for rotary movement upon relative movement between the cam and the block,
   means for moving the block with the cam to a position adjacent to the component, whereby the fingers are inserted between aligned rows of the terminals in a nonsupporting position,
   means for moving the cam relative to the block against the action of the urging means, whereby the fingers are rotated within the housing to position the complementary terminal-enclosing notches of adjacent fingers about the terminals in an aligning and supporting fashion, and means for locking the cam in the terminal-supporting position, whereby the fingers are precluded from further rotary movement.

7. An apparatus for aligning and supporting terminals of a component, which comprises:

a block, a plurality of fingers, each of the fingers having an intermediate shank rotatably supported within the block, each of the fingers formed with a flat having notches complementary with notches of adjacent fingers formed on opposite edges thereof extending in one direction from the shank and a flat having a 90° twist formed in the free end thereof extending from the opposite end of the shank, a cam slidably attached to the block, means for normally urging the cam to a position adjacent to the block, the cam provided with a series of spaces for receiving the twisted ends of the fingers therein, means for positioning the block and the cam adjacent to the component, whereby the notched flats of the fingers are inserted between aligned rows of the terminals in a nonsupporting position, means for sliding the cam away from the block, whereby the twisted ends of the fingers are guided through the spaces to rotate the fingers 90°, thereby positioning the complementary notches of adjacent fingers about the terminals in a terminal aligning and supporting fashion, means for locking the cam in a terminal-supporting position, and means for locking the block in a terminal-supporting position, whereby the cam and the block are precluded from relative movement so that the fingers are held in a terminal-supporting position.

8. An apparatus for supporting terminals extending from a component wherein the terminals are provided with offset bends, which comprises:

means for surrounding the terminals a predetermined distance from the free ends thereof to align the terminals in a desired orientation and to preclude lateral bending of the terminals during a period wherein the terminals are subjected to unusual columnar forces, and means for engaging the offset portions of the terminals to preclude buckling of the terminals during the period wherein the terminals are subjected to the unusual columnar forces.

9. An apparatus for aligning and supporting terminals extending from a component wherein the terminals are bent in an offset fashion at a predetermined angle, which comprises:

a support, means supported within and extending from the support for surrounding terminals a predetermined distance from the free ends thereof, whereby lateral bending of the terminals is precluded during a period when the terminals are subjected to unusual columnar forces, and a wedge mounted on and extending from the support having an angular surface corresponding to the angle of the offset bends wherein the angular surface engages the offset bends of the terminals to preclude buckling of the terminals at the offset bends during the period when the terminals are subjected to the unusual columnar forces.

10. An apparatus for aligning and supporting a row of terminals having offset angular bends extending from a component during a period when the terminals are subjected to unusual columnar forces, which comprises:

a support, a plurality of fingers rotatably supported within the support having flat portions extending therefrom with notches along the edges complementary with notches of adjacent fingers, a wedge mounted on the support having an angular face corresponding to the angle of the offset bends of the terminals, means for positioning the support adjacent to the component, whereby the angular face of the wedge is positioned adjacent to the offset bends to preclude buckling of the terminals during the period when the terminals are subjected to the columnar forces and the flat surfaces of the fingers are positioned on opposite sides of the terminals in a face-to-face relation, and means for rotating the fingers, whereby the terminals are cammed into a desired alignment and are surrounded by the complementary notches of adjacent fingers a predetermined distance from the ends of the terminals, thereby aligning the terminals in a desired orientation and supporting the terminals to preclude lateral bending of the terminals during the period when the terminals are subjected to the unusual columnar forces.

11. Apparatus for aligning and supporting terminals extending from a component, which comprises:

a support block, a plurality of fingers supported within and extending from the block, a fluid cylinder having a shell with a piston rod extending therefrom wherein the rod is attached to the block for positioning the fingers between rows of terminals, a cam slideably attached to the block and in engagement with the fingers for moving the fingers to terminal aligning and supporting positions subsequent to the positioning of the fingers between the rows of terminals, means connecting the cam to the shell of the fluid cylinder for moving the cam when the cylinder shell moves, means for precluding forward movement of the piston rod on a forward cycle when the fingers are positioned between the terminals in a desired fashion, whereby the shell of the fluid cylinder moves with respect to the piston rod away from the block so that the cam is moved to position the fingers in the desired aligning and supporting arrangement about the terminals, means for precluding rearward movement of the piston rod on a reverse cycle, whereby the cylinder shell moves toward the block with respect to the piston rod to move the cam so that the fingers are moved to a nonsupporting alignment between the terminals, and means for removing the rearward preclusion means of the piston rod, whereby the piston rod is withdrawn into the cylinder shell and the fingers are removed from between the terminals.

References Cited by the Examiner
UNITED STATES PATENTS 3,091,452    5/63    Hobbs _____ 269—68

FRANK SUSKO, *Primary Examiner.*

ROBERT C. RIORDON, *Examiner.*

UNITED STATES PATENT OFFICE
CERTIFICATE OF CORRECTION

Patent No. 3,174,744                                March 23, 1965

Harold F. Blair et al.

It is hereby certified that error appears in the above numbered patent requiring correction and that the said Letters Patent should read as corrected below.

Column 8, line 18, for "nonsupportnig" read -- nonsupporting --; line 19, for "side" read -- slide --.

Signed and sealed this 14th day of September 1965.

(SEAL)
Attest:

ERNEST W. SWIDER
Attesting Officer

EDWARD J. BRENNER
Commissioner of Patents